(12) United States Patent
Pereira et al.

(10) Patent No.: US 8,081,423 B2
(45) Date of Patent: Dec. 20, 2011

(54) ELECTRICAL INSTALLATION HAVING A CONTAINER

(75) Inventors: Marcos Pereira, Erlangen (DE); Andreas Zenkner, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 155 days.

(21) Appl. No.: 12/527,075

(22) PCT Filed: Feb. 13, 2007

(86) PCT No.: PCT/DE2007/000277
§ 371 (c)(1),
(2), (4) Date: Aug. 13, 2009

(87) PCT Pub. No.: WO2008/098530
PCT Pub. Date: Aug. 21, 2008

(65) Prior Publication Data
US 2010/0091434 A1    Apr. 15, 2010

(51) Int. Cl.
*H05K 7/20* (2006.01)
(52) U.S. Cl. .......... 361/676; 361/677; 361/679.46; 361/688; 361/696; 361/702; 312/201; 312/223.1; 454/184; 62/259.2

(58) Field of Classification Search .......... 361/612, 361/679.46–679.5, 679.53, 688–693, 695, 361/697–702
See application file for complete search history.

(56) References Cited

U.S. PATENT DOCUMENTS

| | | | | |
|---|---|---|---|---|
| 3,865,181 | A | * | 2/1975 | Mori et al. .......... 165/212 |
| 4,456,867 | A | * | 6/1984 | Mallick et al. .......... 318/778 |
| 7,852,627 | B2 | * | 12/2010 | Schmitt et al. .......... 361/695 |
| 2007/0144704 | A1 | * | 6/2007 | Bundza et al. .......... 165/48.1 |
| 2008/0055846 | A1 | * | 3/2008 | Clidaras et al. .......... 361/687 |
| 2008/0060372 | A1 | * | 3/2008 | Hillis et al. .......... 62/259.2 |
| 2010/0110626 | A1 | * | 5/2010 | Schmitt et al. .......... 361/679.47 |

* cited by examiner

*Primary Examiner* — Courtney Smith
(74) *Attorney, Agent, or Firm* — Laurence A. Greenberg; Werner H. Stemer; Ralph E. Locher

(57) ABSTRACT

An electrical installation has a container which encloses high-voltage components. The electrical installation can be fitted inexpensively and quickly, and at the same time provide sufficient cooling of the high-voltage components. A control room with control elements and/or display elements of the electrical installation and a cool room with a cooling device for at least one of the high-voltage components are disposed in the interior of the container.

16 Claims, 1 Drawing Sheet

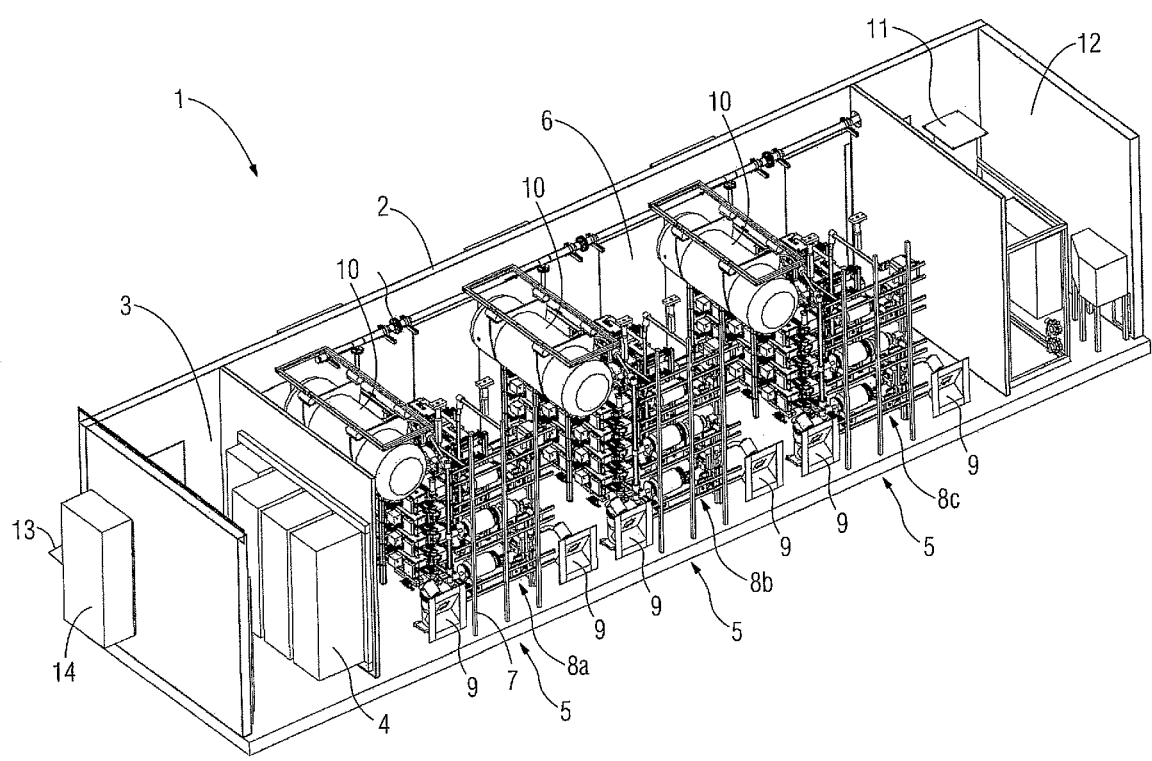

ELECTRICAL INSTALLATION HAVING A CONTAINER

BACKGROUND OF THE INVENTION

Field of the Invention

The invention relates to an electrical installation having a container.

Electrical installations of this kind have already been disclosed by WO 2006/111484 A1, for example. This document reveals an electrical installation having a container which contains components of medium-voltage switchgear. In this case, the container is set up in direct proximity to a generator in a power plant, the generator container being connected between the generator and a voltage transformer which transforms the medium voltage produced by the generator to a high voltage. For the purpose of operating the high-voltage components, the outer wall of the container contains control openings through which a user can initiate necessary steps on the medium-voltage components when needed, for example for maintenance purposes.

DE 43 41 511 A1 describes an electrical installation having a container, wherein protective isolation isolates a control room from a room with medium-voltage components. In addition, an air-conditioning device is arranged on the roof of the container and is used to provide the necessary operating temperature in the interior of the container.

DE 90 16 540 discloses a walk-in container with high-voltage components for power factor correction. The high-voltage components comprise an inductor and a capacitor battery, with a switch being provided for the purpose of connecting a supply network. To connect the supply network to the medium-voltage components, lead-in insulators arranged in the wall of the container are used. In addition, a control device is provided. To cool the interior of the container, an air-conditioning installation is arranged on the roof of the container.

The electrical installations based on the prior art are designed for largely passively operating electrical components in the area of medium-voltage engineering. In these components, the control is assigned a relatively major role only in exceptional cases, for example for maintenance purposes. The electrical design of the high-voltage components is also such that air cooling during operation of the electrical installation is sufficient to ensure the required operating temperature. The air cooling is provided by an air-conditioning or cooling device arranged on the roof of the container. Particularly in the case of actively operating electrical installations, the control of the active components is assigned ever greater significance, however. Furthermore, at higher operating powers, high-voltage components can heat up such that air cooling using an air-conditioning installation is no longer sufficient.

BRIEF SUMMARY OF THE INVENTION

The object of the invention is therefore to provide an electrical installation having a container which is inexpensive and quick to assemble even when fitted with active components, with sufficient cooling of high-voltage components being simultaneously possible.

The invention achieves this object by means of an electrical installation having a container which encloses high-voltage components, wherein the interior of the container contains a control room having control and display elements for the electrical installation and a cooling room having a cooling device for at least one of the high-voltage components.

The invention provides a control room in which all data and control lines for the high-voltage components converge. The container can therefore have its control room designed such that a variable number of high-voltage components can be connected to the controller. This allows an almost identical design for electrical installations with different dimensions. Furthermore, the invention also provides powerful cooling of high-voltage components, the cooling being arranged in a separate cooling room. A sufficiently proportioned cooling installation is expediently set up in the cooling room. The electrical installation can therefore be tested in depth before actually being delivered to a customer, thus preventing difficulties concerning customization to external cooling. Furthermore, the arrangement of components outside the container which are exposed to a high level of heating during operation is also avoided. This provides a compact electrical installation which is simple to assemble. The invention avoids high-voltage components which are arranged outside the container. This means that the electrical installation based on the present invention can also be set up in inhabited areas. Furthermore, setting up a control room and a cooling room allows the isolated and electrically safe arrangement of the components for control and for cooling relative to the high-voltage components. This means that the control and cooling components can also be used during operation of the electrical installation.

Expediently, the control room has a sealable access from outside the container. In line with this advantageous further development, it is possible to grant the operating personnel a separate access for control of the high-voltage components, but with the access to the high-voltage components being made possible only for trained maintenance personnel, for example.

Expediently, the cooling room has a sealable access from outside the container. In line with this advantageous further development, the maintenance personnel for the cooling device can also be granted a separate access to the cooling device, with the access to the high-voltage components for the purpose of maintenance thereof being reserved for further specialized personnel.

Expediently, a high-voltage room which contains high-voltage components is provided inside the container.

Expediently, the high-voltage room has at least one sealable access from outside the container. This allows the selected access to the high-voltage components, as already explained.

Expediently, the wall of the container is at least partially soundproofed. In line with this advantageous further development, the arrangement of noise-intensive high-voltage components within the container is also possible without there being any resultant noise pollution in residential areas, for example, for the surrounding population.

Advantageously, the wall of the container at least partially has thermal insulation or insulation from electromagnetic radiation.

In line with one expedient further development in this regard, the wall of the container is at least partially in double-wall form. The double-wall form provides even more effective noise control.

In line with one expedient further development in this regard, the wall in double-wall form has a soundproofing layer at least in subregions. This soundproofing layer provides particularly advantageous noise control.

Expediently, the container contains an inductor, this inductor being water-cooled, for example. In some applications, inductors heat up such that it is no longer possible to cool them using air alone or they would dissipate too much heat into the room in this way. Instead, water cooling is necessary. The relevant cooling device for the inductor is naturally arranged in the cooling room. In this case, the cooling device is connected to a cooling circuit which routes cooling fluid to the high-voltage components which are to be cooled.

Expediently, the container has, on the outside of the wall, externally accessible high-voltage connections for connecting the electrical installation to a transmission or distribution network. Such high-voltage connections are also referred to as lead-in insulators by a person skilled in the art, these generally comprising a high-voltage conductor which extends through an insulator in the longitudinal direction. As a departure from this, there are also many lead-in insulators in the form of plug-in connections. Such plug-in connections and lead-in insulators are known to a person skilled in the art, however, which means that there is no need to provide a detailed discussion of them at this juncture.

Advantageously, the container has connections for the supply of cooling fluid. The connections for the supply of cooling fluid are expediently produced on the cooling room, with both an input connection and an output connection being provided, for example. Furthermore, a closed cooling circuit is provided, for example. The aim of the cooling room is to cool the cooling fluid to the desired temperature range. Next, the cooled cooling fluid reaches the high-voltage components which are to be cooled and ensures the necessary operating temperature for these components during operation. The cooling fluid is then either routed back to the cooling room with the cooling device, so that a closed cooling circuit is provided within the container. Alternatively, the cooling fluid heated by the high-voltage component exits via the output connection of the container and is passed back to the input connection of the container via an externally arranged heat exchanger and possibly provided filters.

Advantageously, the container contains at least one phase module which has a series circuit of submodules. In line with this advantageous further development, a phase module is provided for a phase of a supply network which is to be connected, each phase module having a series circuit of submodules whose number can be extended according to the applied voltage from the supply network. Expediently, the number of series-connected submodules is designed such that there is the desired voltage drop at each submodule.

Despite the modular extendibility of the phase modules, the embodiment of the control remains clear on account of the central arrangement of the control elements and the connecting cables and data lines, which are all routed to the control room, so that simple, fast and inexpensive assembly of the electrical installation is possible and provided.

Advantageously, each submodule has connecting terminals, an energy store and a power semiconductor circuit connected in parallel with the energy store. In this way, it is possible to produce the voltage zero or the voltage drop at the energy store on the connecting terminals of the submodules according to the actuation of the power semiconductor circuit and according to the topology of the power semiconductor circuit.

In line with one expedient further development in this regard, the power semiconductor circuit and the energy store form a full-bridge circuit. A full-bridge circuit allows the voltage drop at the energy store to be set on the connecting terminals, a zero voltage or the negative of the voltage drop at the energy store. It is therefore possible to set three voltage states.

Alternatively, the power semiconductor circuit has two turn-off power semiconductors arranged in series with one another. A power semiconductor circuit of this kind is the "Marquardt circuit", which has been disclosed by German patent application DE 101 03 031 A1, for example. Such a circuit allows merely the production of a zero voltage on the connecting terminals of the submodules and a capacitive voltage which corresponds to the energy store voltage.

Advantageously, the container contains an active filter, a solid-state power factor corrector or a converter.

Further expedient embodiments and advantages of the invention are the subject matter of the description which follows for exemplary embodiments of the invention with reference to the figures of the drawing, in which

BRIEF DESCRIPTION OF THE DRAWING

The FIGURE shows an exemplary embodiment of the electrical installation according to the invention.

DESCRIPTION OF THE INVENTION

The FIGURE shows an exemplary embodiment of the electrical installation 1 according to the invention, which comprises a container 2 which is shown partially without side and cover walls in the FIGURE. The container 2 shown has a control room 3 which contains control elements 4 for high-voltage components 5. The control elements 4 comprise programmable computation units, regulators, interfaces and the associated control software. In this case, high-voltage components 5 are arranged in a high-voltage room 6, a supporting frame 7 being provided for the purpose of holding the high-voltage components 5.

The high-voltage components 5 comprise three phase modules 8a, 8b and 8c which are respectively connected to one phase of a three-phase voltage network as supply network. For the purpose of connection to the supply network—not shown in the figures—lead-in insulators 9 are provided which are in the form of plug-in connections and are arranged in the omitted side wall of the container 2.

Each phase module 8a, 8b or 8c comprises a series circuit of submodules which have two connection terminals, each submodule comprising a full bridge or what is known as a Marquardt circuit which has a power semiconductor circuit connected in parallel with a capacitor. According to the actuation of the power semiconductor circuit, it is therefore possible to produce the voltage zero or the voltage drop across the capacitor on the connecting terminals of the submodules, the polarity of the voltage also being able to be inverted in the case of a full bridge.

The electrical installation 1 shown in the FIGURE is used as an active filter. For this reason, the power semiconductors in the submodules of the phase modules 8a, 8b and 8c are connected such that harmonics in the connected supply network—not shown in the figures—are rejected. To filter the fault currents produced when connecting the power semiconductors in the submodules, filters are provided which comprise air-core inductors 10. The air-core inductors 10 heat up during operation of the electrical installation 1 to such a great extent that air cooling is no longer sufficient. For the purpose of cooling the air-core inductors 10, water cooling is therefore provided, a closed cooling circuit which has a cooling device 11 being provided. The cooling device 11 is arranged within a cooling room 12 which can be sealed from the outside by means of a door—not shown. The cooling room 12 has a connecting line, so that the necessary cooling fluid, for example distilled water, can be supplied from the outside.

The operation of the electrical installation 1 results in a high level of noise pollution particularly on account of the fluid-cooled air-core inductors 10. For this reason, the walls of the container 2 are in double-wall form, with a damping layer being provided between the walls. A high level of noise pollution as a result of the electrical installation is therefore prevented. The power is supplied to the control units using a secondary power connection 13 which is connected to the control units 4 via a fuse box 14.

In a further exemplary embodiment—not shown in the figures—the damping layer arranged in the walls also has heat-insulating properties. Furthermore, the damping layer also has the property of impeding the electromagnetic radiation of the passage through the walls of the container 2. The damping layer comprises one component, for example. Alternatively, all, some or just one of the enumerated properties may be provided by a plurality of components in the damping layer. Said properties allow the electrical installation to be set up in inhabited areas, for example.

The invention claimed is:

1. An electrical installation, comprising:
   high-voltage components containing at least one phase module having a series circuit of submodules, each of said submodules having two connecting terminals, an energy store and a power semiconductor circuit connected in parallel with said energy store, said power semiconductor circuit having two turn-off power switches disposed in series with one another; and
   a container enclosing said high-voltage components, said container containing an interior having a control room with at least one of control elements and display elements for the electrical installation and a cooling room with a cooling device for at least one of said high-voltage components.

2. The electrical installation according to claim 1, wherein said control room has a sealable access from outside said container.

3. The electrical installation according to claim 1, wherein said cooling room has a sealable access from outside said container.

4. The electrical installation according to claim 1, further comprising a high-voltage room inside said container which contains said high-voltage components.

5. The electrical installation according to claim 4, wherein said high-voltage room has at least one sealable access from outside said container.

6. The electrical installation according to claim 1, wherein said container has a wall that is at least partially soundproofed.

7. The electrical installation according to claim 6, wherein said wall at least partially has at least one of thermal insulation and insulation from electromagnetic radiation.

8. The electrical installation according to claim 6, wherein said wall is at least partially in double-wall form.

9. The electrical installation according to claim 6, wherein said wall has a soundproofing layer at least in subregions.

10. The electrical installation according to claim 1, wherein said container contains at least one inductor.

11. The electrical installation according to claim 10, wherein said inductor is water-cooled.

12. The electrical installation according to claims 6, wherein said container has, on an outside of said wall, externally accessible high-voltage connections for connecting the electrical installation to one of a transmission network and a distribution network.

13. The electrical installation according to claim 12, wherein said high-voltage connections are in a form of part of a plug connection.

14. The electrical installation according to claim 1, wherein said container has connections for a supply of a cooling fluid.

15. The electrical installation according to claim 1, wherein said power semiconductor circuit and said energy store form a full-bridge circuit.

16. The electrical installation according to claim 1, wherein said container contains one of an active filter, a solid-state power factor corrector and a converter.

* * * * *